Oct. 30, 1962     S. E. KENT     3,061,478
PREVENTION OF SCALE FORMATION EVAPORATION OF LIQUIDS
Filed Dec. 14, 1959
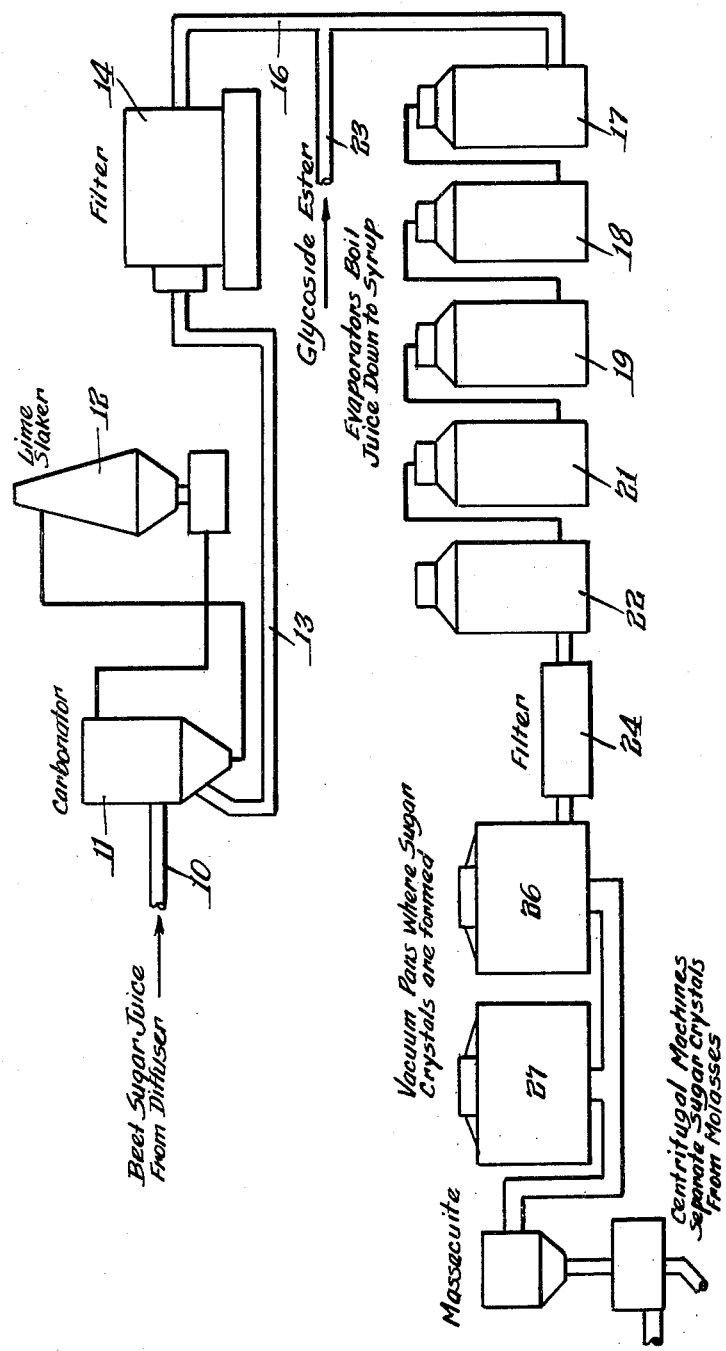
INVENTOR.
Sheldon E. Kent
BY
Wallenstein & Spangenberg
attys

3,061,478
PREVENTION OF SCALE FORMATION IN EVAPORATION OF LIQUIDS

Sheldon E. Kent, Chicago, Ill., assignor to Hodag Chemical Corporation, Chicago, Ill., a corporation of Illinois
Filed Dec. 14, 1959, Ser. No. 859,372
9 Claims. (Cl. 127—61)

My invention relates to the evaporation of liquids, notably dilute sugar juices and especially beet sugar juices, but, in its broader aspects, it also encompasses evaporation of liquids, particularly aqueous solutions, containing substrates particularly of organic character and, more specifically, organic substances of carbohydrate and proteinaceous character, illustrative examples of which are black liquor from paper manufacturing operations, maple syrup, saponins, antibiotics, food and medicinal products. For convenience, it will be described in connection with the evaporation of beet sugar syrups where it has especial utility.

In the usual process of producing beet sugar, after preliminary steps which include carbonation, lime slaking and filtering, the dilute beet sugar juice is boiled down to a syrup in one or more evaporators, usually a series of multiple effect tube evaporators. It is then passed to vacuum pans where beet sugar crystals are formed, the crystals are separated and purified. In the attached drawing, an abbreviated schematic arrangement of equipment is shown in which the foregoing steps are carried out. As shown in said drawing, the sugar beet juice, produced from the sliced sugar beets as, for instance, by the usual diffusion, is passed through conduit 10 into carbonator 11, the system being provided with the conventional lime slaker 12. The sugar beet juice, passing through conduit 13, is filtered in filter 14 and the filtered sugar beet juice is then conducted through conduit 16 into a multiple effect tube evaporator which, in the illustration shown, consists of five effects 17, 18, 19, 21 and 22. The syrup issuing from the evaporator 22 is passed through filter 24, then into the usual vacuum pans or crystallizers 26, 27 where sugar crystals are formed, the sugar crystals being separated and treated in conventional manner.

In the step of evaporating the beet sugar juice, a number of problems arise. The evaporator tubes, on the juice sides thereof, after relatively short periods of operation, become coated with "scale" or organic residues which, after a time, require shut-down and so-called boil-out in order to restore the evaporator to its proper operating efficiency. Such shut-downs entail significant economic losses.

I have discovered that, if there is added to the dilute beet sugar juice, prior to its introduction into the evaporator or evaporators or while said juice is being evaporated, small proportions of certain chemical compounds, hereafter described, a number of important and significant advantages is obtained. Some of these advantages may be listed as follows:

(1) The formation of "scale" or organic residues on the juice sides of the evaporator tubes and pipes, etc. is reduced. This, in turn, reduces the number of times during a given operating period that shut-down or boil-out is required.

(2) The nature or character of the "scale" or organic residue which does deposit on the tubes, pipes, etc. differs from the conventional "scale" or organic residue, being softer and less adherent, and is much more easily removed. This fact, coupled with the longer operating periods before shut-down is required, results in substantial savings in labor and time as well as in other respects so that the economic advantage alone is of significance.

(3) The capacity of the evaporators is increased by reason of improvement in heat transfer, more beet sugar juice being put through the evaporator or evaporators in a given period of operation. This improvement in heat transfer brings about an increase of water evaporation per pound of steam.

(4) In certain instances, improvements result with respect to the incidence of "floc" formation, such improvement apparently being due to there being a lesser amount of impurities carried into the finished beet sugar.

(5) In certain instances, there is a compensatory effect for poorer carbonation which sometimes occurs when the purity of the beets drops or production is at its peak.

Referring to the foregoing drawing, the chemical compounds which, when added to the sugar beet juice, bring about the above-noted advantages, are added to the beet sugar juice just prior to the introduction of the said juice into the evaporators as, for instance, at 23, or admixed with the beet sugar juice in any one or more of the evaporators 17, 18, 19, 21 and 22. For best results, the introduction of said chemical compounds is effected just prior to the passage of the sugar beet juice into the first evaporator 17.

The chemical compounds which I utilize in the manner described above are fatty acid esters of glycosides, the fatty acid acyl radicals of which contain from 8 to 22 carbon atoms and especially from 12 to 14 carbon atoms. Of particular utility are the fatty acid di-esters of methyl glucoside, especially those in which the fatty acid acyl radical contains predominately from 12 to 14 carbon atoms as may be derived, for instance, from coconut oil, coconut oil mixed fatty acids or fractions thereof containing mainly lauric or lauric and myristic acids. These glycoside esters are fully disclosed and methods for their preparation described in United States Letters Patent Nos. 2,759,922 and 2,759,923, both patented August 21, 1956.

The glycoside esters should be thoroughly or intimately admixed with the beet sugar juice or other liquid to be evaporated.

A wide range of proportions of the glycoside esters can be utilized but, in all cases, the proportions are small, usually being in parts per million. Thus, for instance, in the case of a typical beet sugar juice evaporation carried out in multiple effect tube evaporators, excellent results are achieved by feeding coconut oil mixed fatty acid di-esters of methyl glucoside at the rate of 2 gallons per 8-hour shift which calculates to about 4 to 5 parts per million on the basis of using 1,250,000 gallons of juice per 24-hour period. It will be understood, as indicated above, that these proportions are merely illustrative. The amounts depend, in part, on the particular glycoside esters or mixtures thereof utilized, upon the particular liquid composition being evaporated, and upon the extent to which optimum results are sought. In general, from 2 to 20 parts, by weight, per million of liquid to be evaporated will suffice in most cases but these proportions may be varied widely, indeed, up to several hundred parts per million, and the exact proportions selected will ordinarily be dictated at least in part by economic considerations.

The following examples are illustrative of plant scale experiments and serve to show the nature of typical advantages achieved by the practice of my present invention.

EXAMPLE 1

(A) In a beet sugar plant, there was continuously added to the beet sugar juice evaporator feed coconut oil fatty acid di-ester of methyl glucoside at the rate of 2 gallons thereof per 8-hour shift. This amounted to utilizing a concentration of 4 to 5 parts by weight of said ester per million parts of said evaporator feed. The evaporator set-up consisted of a multiple effect tube evaporator and the additions of said ester were made just prior to the sugar beet juice feed entering the first effect. The following Table I shows the number of boil-outs required when using the aforesaid ester in relation to said number when the ester was not used.

*Table I*

| Evaporator | Number of Boil-Outs | |
|---|---|---|
| | Use of Ester | No Ester |
| 1st Effect | None | 2 |
| 2nd Effect | 2 | 3–4 |
| 3rd Effect | 4 | 5–6 |
| 4th Effect | 4 | 5–6 |
| 5th Effect | 4 | 5–6 |

(B) Comparisons were made between the operations of one plant (hereafter called Plant A) where said ester was used as above described, and another plant (hereafter called Plant B) of the same company identical with Plant A but where said ester was not utilized. The following data were obtained as set forth in Table II:

*Table II*

| | Plant A | Plant B |
|---|---|---|
| Percent Sugar in Beets | 14.43 | Greater than 15. |
| Percent Purity of Diffuser Juice | 86 | 87. |
| True Purity of Molasses | 59.8 | 60.5–61. |
| Percent Sugar in Molasses on Beets | 2.31 | 2.4. |
| First Boil-Out 3rd, 4th and 5th Effects | 22nd day | 19th day. |

(NOTE.—Although the sugar beets being handled by Plant A were of poorer quality than those being handled by Plant B, as indicated in the first two items listed in Table II, the results obtained were superior as shown in the last three items of Table II.)

EXAMPLE 2

In another beet sugar plant, wherein the aforesaid ester was used in the amounts and manner described in Example 1, the following observations were made:

(a) During the first 17 days of operation where said ester was utilized, only four evaporators had been boiled out.

(b) In a similar run where no ester was used, six evaporators were boiled out in the first 15 days.

(c) When an evaporator was taken out of the line to be cleaned, the capacity of the remaining evaporators was increased to maintain a given slicing rate, which was 150 tons per hour, this being achieved when the ester was used. In operations where no ester was used, this could not be done, the removal of an evaporator from a line of evaporators causing a decrease in capacity.

(d) When opened for cleaning, where the ester was used, the evaporators were found to be cleaner than when no ester was used, the deposits were soft and easily removed, and less labor and time were required to get the evaporator back into operation.

EXAMPLE 3

In a test run with evaporation of black liquor from paper pulp operations, in a multiple effect tube evaporator, the evaporator feed rate was 198,000 pounds of black liquor per hour. The coconut oil fatty acid di-ester of methyl glucoside was added initially at the rate of 40.7 parts per million and two hours later was increased to 66.5 parts per million and then maintained at said latter figure. The increase in water evaporation over that obtained when no ester was used was approximately 2,000 pounds per hour. This permits steam economy increases of appreciable magnitude and enables one to increase the black liquor feed or to reduce steam flow.

The glycoside esters can be used as such in the practice of my invention or they may be utilized in the form of mixtures thereof with carriers or diluents as, for instance, triglyceride oils, notably vegetable oils such as cottonseed oil, corn oil, soya oil, etc., or mineral oils, or methyl esters of triglyceride oil fatty acids. Furthermore said glycoside esters, as such or admixed with said diluents or carriers, can be used in admixture with emulsifiers such as higher fatty acid monoglycerides, and polyoxyethylene glycol esters of higher fatty acids such as polyethylene glycol (400) mono-oleate, to obtain the known added advantages of said emulsifiers.

The evaporation procedures contemplated by the present invention are concerned with the removal of water from dilute solutions of organic materials in order to effect a concentration of said organic materials. In general, the increase of concentration of solids effected is of the order of 2 to 6 or 7 times that of the original evaporator feed liquid. In any event, such evaporations as are here contemplated are not carried out, per se, to a point where separation of solids as by crystallization is effected in the evaporator. Such steps as crystallization, drying and the like may subsequently be carried out on the evaporated liquids resulting from the practice of my present invention but, when this is done, it is not effected in the evaporators in which the process of my invention is practiced. While the practice of the invention contemplates its being carried out in evaporators of various types as, for instance, vessels to which direct heat is applied as by an open flame, jacketed pans, jacketed kettles, and the like, its most important utility is in connection with evaporation procedures of a continuous character which are most commonly practiced by multiple effect systems and by means of a series of tube evaporators in such systems.

What I claim as new and desire to protect by Letters Patent of the United States is:

1. A process of reducing scale formation in evaporators in which dilute solutions of substrates are heated in evaporators to effect a concentration of said substrates in said solutions but not to the extent of effecting appreciable separation of solids from said solutions in said evaporator, which comprises carrying out said evaporation in the presence of a fatty acid ester of a glycoside, the fatty acid acyl radical of said ester containing from 8 to 22 carbon atoms.

2. A process of reducing scale formation in evaporators in which dilute solutions of substrates are heated in evaporators to effect a concentration of said substrates in said solutions but not to the extent of effecting appreciable separation of solids from said solutions in said evaporator, which comprises carrying out the evaporation in the presence of a fatty acid di-ester of methyl glycoside, the fatty acid acyl radical of said ester containing from 8 to 22 carbon atoms.

3. A process of reducing scale formation in multiple effect tube evaporators in which dilute aqueous solutions of substrates are heated in said evaporators, which comprises carrying out said evaporation in the presence of a fatty acid ester of a glycoside, the fatty acid acyl radical of said ester containing from 8 to 22 carbon atoms.

4. A process of reducing scale formation in multiple effect tube evaporators in which dilute aqueous solutions of substrates are heated in said evaporators, which comprises carrying out said evaporation in the presence of a fatty acid di-ester of methyl glycoside, the fatty acid acyl radical of said ester containing from 8 to 22 carbon atoms.

5. The process of claim 4, in which the fatty acid acyl radical of said ester contains predominately from 12 to 14 carbon atoms.

6. A process of reducing scale formation in multiple effect tube evaporators in which dilute sugar juices are heated in said evaporators to form a syrup therefrom, which comprises carrying out said evaporation in the presence of a fatty acid ester of a glycoside, the fatty acid acyl radical of said ester containing from 8 to 22 carbon atoms.

7. A process of reducing scale formation in multiple effect tube evaporators in which dilute sugar juices are heated in said evaporators to form a syrup therefrom, which comprises carrying out said evaporation in the presence of a fatty acid di-ester of methyl glycoside, the fatty acid acyl radical of said ester containing from 8 to 22 carbon atoms.

8. The process of claim 7, in which the fatty acid acyl radical of said ester contains predominately from 12 to 14 carbon atoms.

9. A process of reducing scale formation in multiple effect tube evaporators in which dilute proteinaceous solutions are heated in said evaporators, which comprises carrying out the evaporation in the presence of a fatty acid ester of a glycoside, the fatty acid acyl radical of said ester containing from 8 to 22 carbon atoms.

References Cited in the file of this patent

UNITED STATES PATENTS

| | | |
|---|---|---|
| 2,591,704 | King | Apr. 8, 1952 |
| 2,871,148 | Kent | Jan. 27, 1959 |